United States Patent
Lamb et al.

(10) Patent No.: US 11,726,243 B2
(45) Date of Patent: Aug. 15, 2023

(54) VISIBLY TRANSPARENT, INFRARED RADIATION RETROREFLECTIVE ARTICLES

(71) Applicant: 3M INNOVATIVE PROPERTIES COMPANY, St. Paul, MN (US)

(72) Inventors: David J. Lamb, Oakdale, MN (US); Guanglei Du, Painted Post, NY (US); Scotty A. Kopp, Oakdale, MN (US); Suman K. Patel, Woodbury, MN (US); John A. Wheatley, Stillwater, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 447 days.

(21) Appl. No.: 16/957,911

(22) PCT Filed: Dec. 27, 2018

(86) PCT No.: PCT/IB2018/060646
§ 371 (c)(1),
(2) Date: Jun. 25, 2020

(87) PCT Pub. No.: WO2019/130234
PCT Pub. Date: Jul. 4, 2019

(65) Prior Publication Data
US 2020/0348458 A1    Nov. 5, 2020

Related U.S. Application Data

(60) Provisional application No. 62/612,478, filed on Dec. 31, 2017.

(51) Int. Cl.
*G02B 5/20* (2006.01)
*G01S 7/481* (2006.01)
(Continued)

(52) U.S. Cl.
CPC ............. *G02B 5/20* (2013.01); *G01S 7/481* (2013.01); *G01S 17/02* (2013.01); *G02B 5/124* (2013.01); *G02B 5/208* (2013.01)

(58) Field of Classification Search
CPC .......... G02B 5/208; G02B 5/124; G02B 5/20; G01S 7/481; G01S 17/02; B02B 5/281; B32B 3/26
See application file for complete search history.

(56) References Cited

U.S. PATENT DOCUMENTS

| 4,588,258 A | 5/1986 | Hoopman |
| 4,775,219 A | 10/1988 | Appeldorn |

(Continued)

FOREIGN PATENT DOCUMENTS

| WO | WO 2011-129831 | 10/2011 |
| WO | WO 2013-043827 | 3/2013 |

(Continued)

OTHER PUBLICATIONS

International Search Report for PCT International Application No. PCT/IB2018/060646, dated Apr. 16, 2019, 4 pages.

*Primary Examiner* — Darryl J Collins
*Assistant Examiner* — Tamara Y. Washington
(74) *Attorney, Agent, or Firm* — Robert S. Moshrefzadeh (57) ABSTRACT

A retroreflective article including a retroreflective layer including a structured surface that is opposite a major surface, a pressure sensitive adhesive that contacts at least a portion of the structured surface to form an optically inactive area that does not substantially retroreflect incident light and at least one low refractive index layer forming an optically active area that retroreflects incident light, wherein the optically active area comprises about 25% or less of the structured surface.

13 Claims, 3 Drawing Sheets

(51) Int. Cl.
    *G01S 17/02*     (2020.01)
    *G02B 5/124*     (2006.01)

(56) References Cited

U.S. PATENT DOCUMENTS

| | | |
|---|---|---|
| 6,024,455 A | 2/2000 | O'Neill |
| 7,422,334 B2 | 9/2008 | Smith |
| 7,611,251 B2 | 11/2009 | Thakkar |
| 8,496,339 B2 | 7/2013 | Nakajima |
| 9,140,833 B2 | 9/2015 | Patel |
| 2006/0003178 A1 | 1/2006 | Strobel |
| 2014/0067187 A1 | 3/2014 | Ferguson |
| 2018/0059318 A1* | 3/2018 | Nichol ................ G02B 6/0028 |
| 2019/0163980 A1* | 5/2019 | Johnson ............... G08G 1/0175 |

FOREIGN PATENT DOCUMENTS

| | | |
|---|---|---|
| WO | WO 2014-039200 | 3/2014 |
| WO | WO2017-127734 | 7/2017 |
| WO | WO2017-197223 | 11/2017 |

* cited by examiner

VISIBLY TRANSPARENT, INFRARED RADIATION RETROREFLECTIVE ARTICLES

CROSS REFERENCE TO RELATED APPLICATIONS

This application is a national stage filing under 35 U.S.C. 371 of PCT/IB2018/060646, filed Dec. 27, 2018, which claims the benefit of Provisional Application No. 62/612,478, filed Dec. 31, 2017, the disclosure of which is incorporated by reference in its/their entirety herein.

FIELD

This invention relates to retroreflective articles that retroreflect infrared radiation from surfaces while not appearing to be visually retroreflecting.

BACKGROUND

Autonomous vehicles require multiple sensor systems operating in different portions of the electromagnetic spectrum to maximize the visibility of the world around the vehicle. Autonomous vehicles will likely utilize radar, visible light cameras, infrared (IR) sensor systems and others, as each has strengths, weaknesses and potential for redundancy.

One useful system is Light Detection and Ranging (LiDAR). LiDAR is an IR laser based system that generates a point map of the surrounds. However, systems that operate in the IR portion of the electromagnetic spectrum such as IR cameras and LiDAR often have difficulty distinguishing objects of certain visual appearance (e.g., color or texture) from the background. For example, black or dark colors do not provide a strong return to IR machine vision sensors. Thus, IR cameras and LiDAR systems can have difficulty distinguishing black or dark colored cars.

SUMMARY

In view of the foregoing, we recognize that there is a need for materials that are more easily distinguished by machines operating in the IR.

Briefly, in one aspect, the present invention provides a retroreflective article comprising (a) a retroreflective layer including a structured surface that is opposite a major surface, (b) a pressure sensitive adhesive that contacts at least a portion of the structured surface to form an optically inactive area that does not substantially retroreflect incident light and (c) at least one low refractive index layer forming an optically active area that retroreflects incident light; wherein the optically active area comprises about 25% or less of the structured surface.

The retroreflective articles of the invention enable retroreflection of IR from surfaces that do not appear to be visually retroreflecting. Thus, the retroreflective article can be seen by machines operating in the IR but are not seen by the human eye. The degree of retroreflectivity can be controlled so that the article is not visually overwhelming yet provides an appropriate level of signal to the IR machine vision sensor.

The retroreflective articles of the invention can be added to the surface of a vehicle or other object to make them more detectable without appreciably altering the visual appearance of the surface. For example, the retroreflective articles can be mostly visibly clear to reveal an underlying paint color, or they can be colored to match an underlying paint color.

DETAILED DESCRIPTION

Retroreflective materials are characterized by the ability to redirect light incident on the material back toward the originating light source. Cube corner retroreflective sheeting, sometimes referred to as "prismatic" sheeting, typically comprises a thin transparent layer having a substantially planar first surface and a second structured surface comprising a plurality of geometric structures, some or all of which include three reflective faces configured as a cube corner element.

Typically, a cube corner element includes three mutually perpendicular optical faces that intersect at a single apex. Generally, light that is incident on a corner cube element from a light source is totally internally reflected from each of the three perpendicular cube corner optical faces and is redirected back toward the light source.

The retroreflective articles of the present disclosure include one or more optically active areas in which incident light is retroreflected by a structured surface including, for example, cube corner elements, and one or more optically inactive areas in which incident light is not substantially retroreflected by the structured surface. The optically active areas include a low refractive index layer or material adjacent to a portion of the structured surface. The optically inactive areas include a pressure sensitive adhesive adjacent to a portion of the structured surface. The pressure sensitive adhesive substantially destroys the retroreflectivity of the portions of the structured surface that are directly adjacent thereto. The low refractive index layer assists in maintaining the retroreflectivity of the adjacent structured surface by forming a "barrier" between the structured surface and the pressure sensitive adhesive.

The retroreflective articles of the invention can be optimized to have enough retroreflection of IR radiation to be seen by IR sensors yet they do not appear to be visually retroreflecting to the human eye. Thus, in some embodiments, the optically active area comprises about 25% or less, 20% or less, 15% or less, 10% or less, or 5% or less, of the structured surface.

Figure 1A:
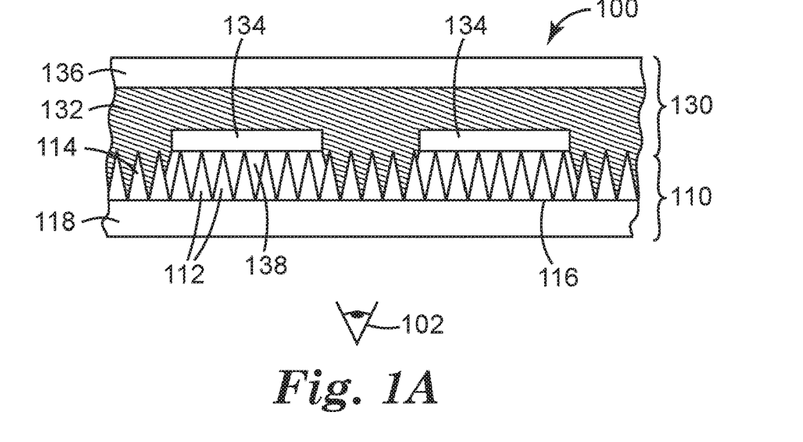
FIGS. 1A and 1B are schematic side views of one exemplary embodiment of a retroreflective article of the present disclosure.
Figure 1B:
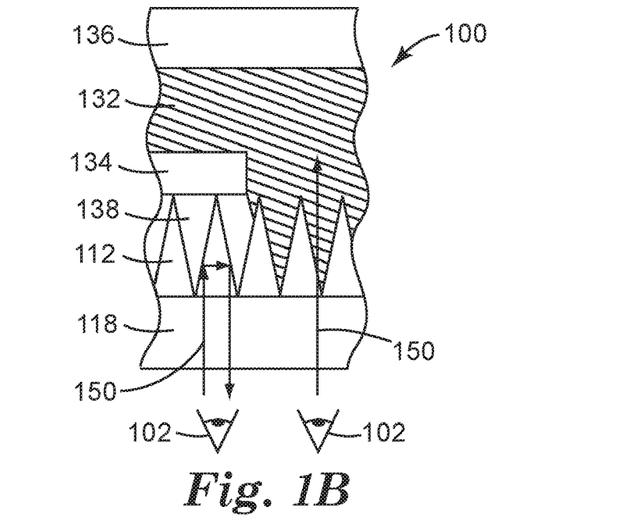

FIGS. 1A and 1B show one exemplary embodiment of a retroreflective article 100 that faces viewer 102. Retroreflective article 100 includes a retroreflective layer 110 including multiple cube corner elements 112 that collectively form a structured surface 114 opposite a major surface 116. Retroreflective layer 110 also includes an overlay layer 118. A pressure sensitive adhesive layer 130 is adjacent to retroreflective layer 110. Pressure sensitive adhesive layer 130 includes a pressure sensitive adhesive 132, one or more barrier layers 134, and a liner 136. Barrier layer 134 has sufficient structural integrity to prevent pressure sensitive adhesive 132 from flowing into a low refractive index layer 138 that is between structured surface 114 and barrier layer 134. Barrier layer 134 can directly contact or be spaced apart from or can push slightly into the tips of cube corner elements 112.

Where present, barrier layers 134 form a physical "barrier" between pressure sensitive adhesive 130 and cube corner elements 112. Barrier layers may prevent wetting of cube tips or surfaces by the pressure sensitive either initially during fabrication of the retroreflective article or over time due to the viscoelastic nature of the adhesive. A trapped layer between pressure sensitive adhesive 130 and cube corner elements 112 is low refractive index layer 138. The low refractive index layer is thereby enclosed. If a protective layer is applied thereto, the low refractive index layer is encapsulated. Encapsulation of the low refractive index layer maintains and/or protects the integrity of the low refractive index layer. The presence of the barrier layer permits the portions of structured surface 114 adjacent to low refractive index layer 138 and/or barrier layers 134 to retroreflect incident light 150. Barrier layers 134 may also prevent pressure sensitive adhesive 130 from wetting out the cube sheeting. Pressure sensitive adhesive 130 that is not in contact with a barrier layer 134 adheres to the cube corner elements, thereby effectively sealing the retroreflective areas to form optically active areas or cells. Pressure sensitive adhesive 130 also holds the entire retroreflective construction together, thereby eliminating the need for a separate sealing film and sealing process. In some embodiments, the pressure sensitive adhesive is in intimate contact with or is directly adjacent to the structured surface or the cube corner elements.

As is shown in FIG. 1B, a light ray 150 incident on a cube corner element 112 that is adjacent to low refractive index layer 138 is retroreflected back to viewer 102. For this reason, an area of retroreflective article 100 that includes low refractive index layer 138 is referred to as an optically active area. In contrast, an area of retroreflective article 100 that does not include low refractive index layer 138 is referred to as an optically inactive area because it does not substantially retroreflect incident light.

Low refractive index layer 138 includes a material that has a refractive index that is less than about 1.30, less than about 1.25, less than about 1.2, less than about 1.15, less than about 1.10, or less than about 1.05. Exemplary low refractive index materials include air and low index materials (e.g., low refractive index materials described in U.S. Pat. No. 9,140,833, which is hereby incorporated herein by reference).

In general, any material that prevents the pressure sensitive adhesive from contacting cube corner elements 112 or flowing or creeping into low refractive index layer 138 can be used in barrier layer 134. Exemplary materials for use in barrier layer 134 include resins, polymeric materials, dyes, inks, vinyl, inorganic materials, UV-curable polymers, pigment, particle, and bead. The size and spacing of the barrier layers can be varied. In some embodiments, the barrier layers may form a pattern on the retroreflective sheeting. In some embodiments, one may wish to reduce the visibility of the pattern on the sheeting. Thus, it may be preferred that the patterns be discontinuous or composed of discrete barriers.

In at least some embodiments, the pressure sensitive adhesive layer includes a first region and a second region. The second region is in direct or intimate contact with the structured surface. The first and second regions have sufficiently different properties to form and separate the low refractive index layer between and from the pressure sensitive adhesive layer and the structured surface of the retroreflective layer. In some embodiments, the second region includes a pressure sensitive adhesive and the first region differs in composition from the second region. In some embodiments, the first region and the second region have different polymer morphology. In some embodiments, the first region and the second region have different flow properties. In some embodiments, the first region and the second region have different viscoelastic properties. In some embodiments, the first region and the second region have different adhesive properties. In some embodiments, the retroreflective article includes a plurality of second regions that form a pattern. In some embodiments, the pattern is one of an irregular pattern, a regular pattern, a grid, words, graphics, and lines. In some embodiments, the pattern can be machine readable.

Exemplary pressure sensitive adhesives for use in the retroreflective articles of the present disclosure include crosslinked tackified acrylic pressure-sensitive adhesives. Other pressure sensitive adhesives such as blends of natural or synthetic rubber and resin, silicone or other polymer systems, with or without additives can be used. The PSTC (pressure sensitive tape council) definition of a pressure sensitive adhesive is an adhesive that is permanently tacky at room temperature which adheres to a variety of surfaces with light pressure (finger pressure) with no phase change (liquid to solid).

Acrylic Acid and Meth(acrylic) Acid Esters: The acrylic esters are present at ranges of from about 65 to about 99 parts by weight, preferably about 78 to about 98 parts by weight, and more preferably about 90 to about 98 parts by weight. Useful acrylic esters include at least one monomer selected from the group consisting of a first monofunctional acrylate or methacrylate ester of a non-tertiary alkyl alcohol, the alkyl group of which comprises from 4 to about 12 carbon atoms, and mixtures thereof. Such acrylates or methacrylate esters generally have, as homopolymers, glass transition temperatures below about −25° C. A higher amount of this monomer relative to the other comonomers affords the PSA higher tack at low temperatures.

Preferred acrylate or methacrylate ester monomers include, but are not limited to, those selected from the group consisting of n-butyl acrylate (BA), n-butyl methacrylate, isobutyl acrylate, 2-methyl butyl acrylate, 2-ethylhexyl acrylate, n-octyl acrylate, isooctyl acrylate (IOA), isooctyl methacrylate, isononyl acrylate, isodecyl acrylate, and mixtures thereof.

Particularly preferred acrylates include those selected from the group consisting of isooctyl acrylate, n-butyl acrylate, 2-methyl butyl acrylate, 2-ethylhexyl acrylate, and mixtures thereof.

Polar Monomers: Low levels of (typically about 1 to about 10 parts by weight) of a polar monomer such as a carboxylic acid can be used to increase the cohesive strength of the pressure-sensitive adhesive. At higher levels, these polar monomers tend to diminish tack, increase glass transition temperature and decrease low temperature performance.

Useful copolymerizable acidic monomers include, but are not limited to, those selected from the group consisting of ethylenically unsaturated carboxylic acids, ethylenically unsaturated sulfonic acids, and ethylenically unsaturated phosphonic acids. Examples of such monomers include those selected from the group consisting of acrylic acid (AA), methacrylic acid, itaconic acid, fumaric acid, crotonic acid, citraconic acid, maleic acid, beta-carboxyethyl acrylate, sulfoethyl methacrylate, and the like, and mixtures thereof.

Other useful copolymerizable monomers include, but are not limited to, (meth)acrylamides, N,N-dialkyl substituted (meth)acrylamides, N-vinyl lactams, and N,Ndialkylaminoalkyl (meth)acrylates. Illustrative examples include, but are not limited to, those selected from the group consisting of N,N-dimethyl acrylamide, N,N-dimethyl methacrylamide, N,N-diethyl acrylamide, N,N-diethyl methacrylamide, N,Ndimethylaminoethyl methacrylate, N,N-dimethylaminopropyl methacrylate, N,Ndimethylaminoethyl acrylate, N,N-dimethylaminopropyl acrylate, N-vinyl pyrrolidone, Nvinyl caprolactam, and the like, and mixtures thereof.

Non-polar Ethylenically Unsaturated Monomers: The non-polar ethylenically unsaturated monomer is a monomer whose homopolymer has a solubility parameter as measured by the Fedors method (see Polymer Handbook, Bandrup and Immergut) of not greater than 10.50 and a Tg greater than 15° C. The non-polar nature of this monomer tends to improve the low energy surface adhesion of the adhesive. These non-polar ethylenically unsaturated monomers are selected from the group consisting of alkyl (meth)acrylates, Nalkyl (meth)acrylamides, and combinations thereof. Illustrative examples include, but are not limited to, 3,3,5-trimethylcyclohexyl acrylate, 3,3,5-trimethylcyclohexyl methacrylate, cyclohexyl acrylate, cyclohexyl methacrylate, isobornyl acrylate, isobornyl methacrylate, N-octyl acrylamide, N-octyl methacrylamide or combinations thereof. Optionally, from 0 to 25 parts by weight of a non-polar ethylenically unsaturated monomer may be added.

Tackifiers: Preferred tackifiers include terpene phenolics, rosins, rosin esters, esters of hydrogenated rosins, synthetic hydrocarbon resins and combinations thereof. These provide good bonding characteristics on low energy surfaces. Hydrogenated rosin esters and hydrogenated C9 aromatic resins are the most preferred tackifiers because of performance advantages that include high levels of "tack", outdoor durability, oxidation resistance, and limited interference in post crosslinking of acrylic PSAs.

Tackifiers may be added at a level of about 1 to about 65 parts per 100 parts of the monofunctional acrylate or methacrylate ester of a non-tertiary alkyl alcohol, the polar monomer, and the nonpolar ethylenically unsaturated monomer to achieve desired "tack". Preferably, the tackifier has a softening point of about 65 to about 100° C. However, the addition of tackifiers can reduce shear or cohesive strength and raise the Tg of the acrylic PSA, which is undesirable for cold temperature performance.

Crosslinkers: In order to increase the shear or cohesive strength of acrylic pressure-sensitive adhesives, a crosslinking additive is usually incorporated into the PSA. Two main types of crosslinking additives are commonly used. The first crosslinking additive is a thermal crosslinking additive such as a multifunctional aziridine. One example is 1,1'-(1,3-phenylene dicarbonyl)-bis-(2-methylaziridine) (CAS No. 7652-64-4), referred to herein as "bisamide". Such chemical crosslinkers can be added into solvent based PSAs after polymerization and activated by heat during oven drying of the coated adhesive.

In another embodiment, chemical crosslinkers that rely upon free radicals to carry out the crosslinking reaction may be employed. Reagents such as, for example, peroxides serve as a source of free radicals. When heated sufficiently, these precursors will generate free radicals, which bring about a crosslinking reaction of the polymer. A common free radical generating reagent is benzoyl peroxide. Free radical generators are required only in small quantities, but generally require higher temperatures to complete the crosslinking reaction than those required for the bisamide reagent.

The second type of chemical crosslinker is a photosensitive crosslinker that is activated by high intensity ultraviolet (UV) light. Two common photosensitive crosslinkers used for hot melt acrylic PSAs are benzophenone and 4-acryloxybenzophenone, which can be copolymerized into the PSA polymer. Another photocrosslinker, which can be post-added to the solution polymer and activated by UV light is a triazine; for example, 2,4-bis(trichloromethyl)-6-(4-methoxy-phenyl)-s-triazine. These crosslinkers are activated by UV light generated from artificial sources such as medium pressure mercury lamps or a UV blacklight.

Hydrolyzable, free-radically copolymerizable crosslinkers, such as monoethylenically unsaturated mono-, di- and trialkoxy silane compounds including, but not limited to, methacryloxypropyltrimethoxysilane (SILANE™ A-174 available from Union Carbide Chemicals and Plastics Co.), vinyldimethylethoxysilane, vinylmethyldiethoxysilane, vinyltriethoxysilane, vinyltrimethoxysilane, vinyltriphenoxysilane, and the like are also useful crosslinking agents.

Crosslinker is typically present from 0 to about 1 part by weight based on 100 parts by weight of acrylic acid or meth(acrylic) acid esters, polar monomers, and non-polar ethylenically unsaturated monomers.

Aside from thermal, moisture, or photosensitive crosslinkers, crosslinking may also be achieved using high-energy electromagnetic radiation such as gamma or e-beam radiation. In this case, no crosslinker may be required.

Other Additives: Because acrylic pressure-sensitive adhesives have excellent oxidative stability, additives such as antioxidant and UV light absorbers are generally not needed. Small amounts of heat stabilizer can be utilized in hot melt acrylic PSAs to increase thermal stability during processing.

Plasticizers: Optionally, low levels of plasticizer (e.g., less than about 10 parts by weight) may be combined with tackifier to adjust the Tg in order to optimize the peel and the low temperature performance of the adhesive. Plasticizers that may be added to the adhesive of the invention may be selected from a wide variety of commercially available materials. In each case, the added plasticizer must be compatible with the tackified acrylic PSA used in the formulation. Representative plasticizers include polyoxyethylene aryl ether, dialkyl adipate, 2-ethylhexyl diphenyl phosphate, t-butylphenyl diphenyl phosphate, di(2-ethylhexyl) adipate, toluenesulfonamide, dipropylene glycol dibenzoate, polyethylene glycol dibenzoate, polyoxypropylene aryl ether, dibutoxyethoxyethyl formal, and dibutoxyethoxyethyl adipate.

Various polymeric film substrates comprised of various thermosetting or thermoplastic polymers are suitable for use as the overlay and body layer. The body layer may be a single layer or multi-layer film. Illustrative examples of polymers that may be employed as the body layer film for flexible retroreflective articles include (1) fluorinated polymers such as poly(chlorotrifluoroethylene), poly(tetrafluoroethylene-cohexafluoropropylene), poly(tetrafluoroethylene-co-perfluoro(alkyl)vinylether), poly(vinylidene fluoride-co-hexafluoropropylene); (2) ionomeric ethylene copolymers poly(ethylene-co-methacrylic acid) with sodium or zinc ions such as SURLYN-8920 Brand and SURLYN-9910 Brand available from E.I. DuPont Nemours, Wilmington, Del.; (3) low density polyethylenes such as low density polyethylene; linear low density polyethylene; and very low density polyethylene; plasticized vinyl halide polymers such as plasticized poly(vinychloride); (4) polyethylene copolymers including acid functional polymers such as poly(ethylene-co-acrylic acid) "EAA", poly(ethylene-co-methacrylic acid) "EMA", poly(ethylene-co-maleic acid), and poly(ethylene-co-fumaric acid); acrylic functional polymers such as poly(ethylene-co-alkylacrylates) where the alkyl group is methyl, ethyl, propyl, butyl, et cetera, or $CH_3(CH_2)_n$- where n is 0 to 12, and poly(ethylene-co-vinylacetate) "EVA"; and (5) (e.g.) aliphatic polyurethanes. The body layer is preferably an olefinic polymeric material, typically comprising at least 50 wt-% of an alkylene having 2 to 8 carbon atoms with ethylene and propylene being most commonly employed. Other body layers include for example poly(ethylene naphthalate), polycarbonate, poly(meth)acrylate (e.g., polymethyl methacrylate or "PMMA"), polyolefins (e.g., polypropylene or "PP"), polyesters (e.g., polyethylene terephthalate or "PET"), polyamides, polyimides, phenolic resins, cellulose diacetate, cellulose triacetate, polystyrene, styrene-acrylonitrile copolymers, cyclic olefin copolymers, epoxies, and the like.

Exemplary liners for use in the retroreflective articles of the present disclosure include silicone coated materials such as papers and polymeric films, including plastics. The liner base material may be single or multiple layer. Specific examples include, polyester (for example polyethylene terephthalate), polyethylene, polypropylene (including cast and biaxially oriented polypropylene), and papers (including clay coated paper, polyethylene coated paper or a polyethylene coated poly(ethylene terephthalate) film.

In some embodiments, such as in retroreflective article 100, cube corner elements 112 are in the form of a tetrahedron or a pyramid. The dihedral angle between any two facets may vary depending on the properties desired in an application. In some embodiments (including the one shown in FIGS. 1A and 1B), the dihedral angle between any two facets is 90 degrees. In such embodiments, the facets are substantially perpendicular to one another (as in the corner of a room) and the optical element may be referred to as a cube corner. Alternatively, the dihedral angle between adjacent facets can deviate from 90° as described, for example, in U.S. Pat. No. 4,775,219, the disclosure of which is incorporated in its entirety herein by reference. Alternatively, the optical elements in the retroreflective article can be truncated cube corners. The optical elements can be full cubes, truncated cubes, or preferred geometry (PG) cubes as described in, for example, U.S. Pat. No. 7,422,334, the disclosure of which is incorporated in its entirety herein by reference. Each retroreflecting optical element includes a symmetry axis that makes equal angles with the facets. In some embodiments, the symmetry axis is perpendicular to a base or front surface. In some embodiments, the symmetry axis is not perpendicular to the base or the front surface and the apex or optical element is canted as described, for example, in U.S. Pat. No. 4,588,258, the disclosure of which is incorporated in its entirety herein by reference. Retroreflective layer 110 of FIGS. 1A and 1B is shown as including overlay layer 118 and no land layer or land portion. A land layer may be defined as continuous layer of material coextensive with the cube corner elements and composed of the same material. This construction may be desirable for flexible embodiments. Those of skill in the art will appreciate that retroreflective layer 110 can include a land layer or land portion.

Figure 2:
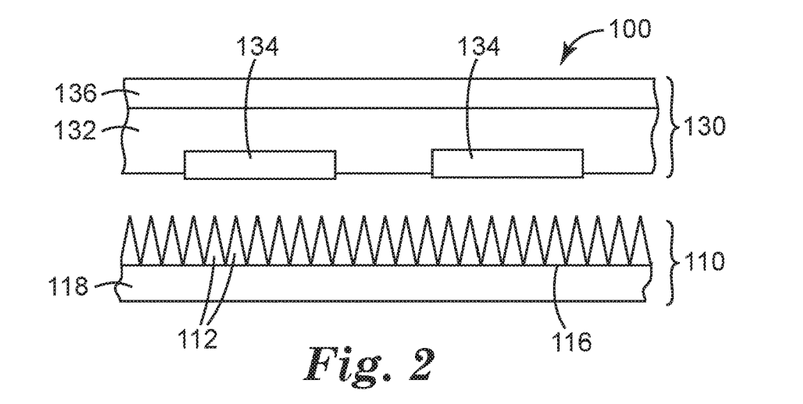
FIG. 2 is schematic drawing of one exemplary intermediary step in forming the retroreflective article of FIG. 1.

As is schematically shown in FIG. 2, one method of making at least some of the retroreflective articles of the present disclosure involves placing barrier layer material 134 onto a pressure sensitive adhesive material 132 and then laminating the resulting pressure sensitive adhesive layer 130 to a retroreflective layer 110. The pressure sensitive adhesive layer 130 can be formed in a variety of ways including but not limited to the following exemplary methods. In one exemplary embodiment, the material(s) forming the barrier layer are printed onto the pressure sensitive adhesive. The method of printing can be, a non-contact method such as, for example, printing using an inkjet printer. The method of printing can be a contact printing method such as, for example, flexographic printing. In another exemplary embodiment, the material(s) forming the barrier layer are printed onto a flat release surface using, for example, an inkjet or screen printing method, and are then subsequently transferred from the flat release surface onto the pressure sensitive adhesive. In another exemplary embodiment, the material(s) forming the barrier layer are flood coated onto a microstructured adhesive surface (e.g., a Comply liner manufactured by 3M Company of St. Paul, Minn.). The barrier layer material is subsequently transferred from the microstructured liner to the pressure sensitive adhesive by, for example, lamination. The retroreflective article may then, optionally, be adhesively bonded to a substrate (e.g., an automobile).

Figure 3:
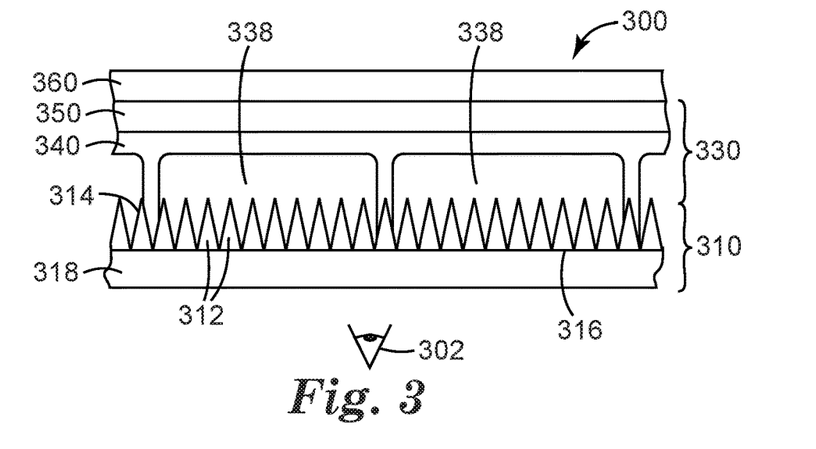
FIG. 3 is a schematic drawing of one exemplary embodiment of a retroreflective article of the present disclosure.
Figure 4:
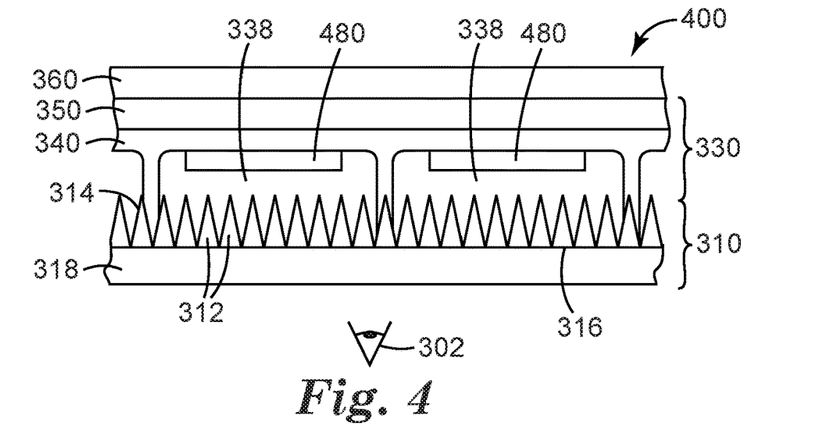
FIG. 4 is a schematic drawing of one exemplary embodiment of a retroreflective article of the present disclosure.

FIGS. 3 and 4 show some alternative exemplary retroreflective articles of the present disclosure. Specifically, FIGS. 3 and 4 show retroreflective articles including structured sealing layers. In some embodiments, the sealing layer includes at least one of, for example, a thermoplastic polymer, a cross-linkable material, and a radiation curable material. In some embodiments, the sealing layer comprises an adhesive, such as, for example, a heat activated adhesive, and/or a pressure sensitive adhesive. These constructions are characterized by having an embossed, replicated, or a similarly formed sealing layer laminated to the back of the retroreflective layer. The sealing layer can be a pressure sensitive adhesive, heat activated adhesive, or other material that can be formed using replication, heat embossing, extrusion replication, or the like.

FIG. 3 is a schematic drawing of one exemplary embodiment of a retroreflective article 300 that faces viewer 302. Retroreflective article 300 includes a retroreflective layer 310 including multiple cube corner elements 312 that collectively form a structured surface 314 opposite a major surface 316. Retroreflective layer 310 also includes an overlay layer 318. Retroreflective layer 310 is shown as a flexible substrate without a land layer or land portion, but, as is described above, retroreflective layer 310 can include a land layer and/or optical elements of any type. A structured adhesive layer 330 is adjacent to retroreflective layer 310. Structured adhesive layer 330 includes raised areas (a region that is raised relative to a surrounding region) of adhesive in a closed pattern, such as, for example, a hexagonal array. Structured adhesive layer includes structured adhesive liner 340 and hot melt adhesive layer 350. Structured adhesive layer 330, when bonded to retroreflective layer 310, defines low refractive index layers 338 that retain the retroreflective nature of structured surface 314. More specifically, the presence of low refractive index layers 338 permit the portions of structured surface 314 adjacent to low refractive index layers 338 to retroreflect incident light 150. As such, portions of retroreflective article 300 that include cube corner elements 312 adjacent to low refractive index layers 338 are optically active in that they retroreflect incident light. In contrast, portions of retroreflective article 300 that have portions of structured adhesive layer 330 adjacent to cube corner elements 312 are optically inactive areas in that they do not substantially retroreflect incident light. Portions of structured adhesive layer 330 that are not in contact with structured surface 314 adhere to the cube corner elements 312, thereby effectively sealing the retroreflective areas to form optically active areas or cells. Structured adhesive layer 330 also holds the entire retroreflective construction together, thereby eliminating the need for a separate sealing layer and sealing process. In the embodiment shown in FIG. 3, retroreflective article 300 is adhesively bonded to a substrate 360.

The structured adhesive layer can be formed in several different ways. The structured adhesive layer can include, for example, multiple layers formed at the same time or can be built through repeated coating steps. One exemplary method starts with a flat film of adhesive, optionally on a carrier web. The adhesive is nipped between a flat roll and a roll with the required relief pattern. With the addition of temperature and pressure, the relief pattern is transferred to the adhesive. A second exemplary method requires a castable or extrudable adhesive material. A film of the adhesive is created by extruding the material onto a roll with the required relief pattern. When the adhesive material is removed from the roll, it retains the relief pattern associated with the roll. The structured adhesive layer is then laminated to the retroreflective layer.

In an alternative embodiment, the structured adhesive layers can include, for example, a material that is not an adhesive but is coated with an adhesive on the tips of the structure.

An exemplary method of making such a retroreflective article 400 begins with a flat non-adhesive film such as, for example, polyethylene. The polyethylene film is nipped between a flat roll and a roll with the required relief pattern. With the addition of temperature and pressure, the relief pattern is transferred to the polyethylene film. An adhesive is then transferred to the tips of the replicated film using, for example, kiss coating or another suitable method. The adhesive covered structured liner is then laminated to the retroreflector.

Regardless of which manufacturing method described above is used, the structured adhesive layer is then bonded to the retroreflective layer by nipping the two films together in a nip consisting of two flat rolls. With the addition of temperature and pressure, the films adhesively bond, creating pockets of air that retain the retroreflection of the cube corner elements.

Optionally, the first region or unraised portions of the adhesive can be patterned with a material that acts to reduce the creep of the structured adhesive layer seal legs, as well as minimizing the detrimental effect of touchdown by the bottom of the well on the tips of the cube corner elements during processing or use. FIG. 4 shows a retroreflective article 400 in which a barrier layer 480 is limited to the bottom of the structured adhesive layer, but barrier layer 480 could be anywhere in the wells as long as it does not substantially reduce the adhesion of the seal legs to retroreflective layer 310.

The structured adhesive layers of FIGS. 3-4 can include, for example, a thermoplastic polymer, a heat-activated adhesive, such as, for example, an acid/acrylate or anhydride/acrylate modified EVAs such as, for example, Bynel 3101, such as described in, for example, U.S. Pat. No. 7,611,251, the entirety of which is herein incorporated by reference. The structured adhesive layers of FIGS. 3-4 can include, for example, an acrylic PSA, or any other embossable material with adhesive characteristics that will adhere to the corner cube elements. The interface between the seal film layer and the (e.g. cube-corner) microstructured layer typically include an adhesion promoting surface treatment. Various adhesion promoting surface treatments are known and include for example, mechanical roughening, chemical treatment, (air or inert gas such as nitrogen) corona treatment (such as described in US2006/0003178A1), plasma treatment, flame treatment, and actinic radiation.

The retroreflective articles of the invention can be made substantially clear by using a substantially clear pressure sensitive adhesive. In other embodiments, the retroreflective article may comprise a wavelength selective absorbing layer having visible absorption at 400 nm-700 nm greater than about 30% and a near infrared transmittance at 830 nm-900 nm greater than about 30%. This layer will allow transmittance of IR that is retroreflected from the article but will absorb any visible light that is retroreflected from the article. The wavelength selective absorbing layer can be disposed adjacent the major surface of the retroreflective layer. The wavelength selective absorbing layer can be matched to the color of the substrate to which the retroreflective article will be applied.

In some examples, the wavelength selective absorbing layer may include any suitable dye or pigment that has a greater infrared transmittance than a visible transmittance, for example, a near-infrared black ink that substantially absorbs visible wavelengths while transmitting near-infrared wavelengths. For example, the wavelength selective absorbing layer may include dyes or inks such as Spectre™ inks, for example Spectre™ 100, 110, 120, 130, 140, 150, or 160 (Epolin, Newark, N.J.); Mimaki inks, for example Mimaki ES3, SS21, BS3, SS2, or HS (Mimaki Global, Tomi-city, Nagano, Japan); or Seiko inks, for example Seiko 1000, 1300, SG700, SG740, or VIC (Seiko Advance Ltd., Japan). In some examples, the wavelength selective absorbing layer may include one or more of cyan, magenta, yellow, or black dye components, or may include a dye having any desired color, for example, by scattering or reflecting a predetermined wavelength band, peak, or spectrum associated with a predetermined color. In some examples, the wavelength selective absorbing layer may include a spectrally selective multilayer absorbing film that may have a greater infrared transmittance than a visible transmittance. The wavelength selective absorbing layer, while blocking visible wavelengths, may transmit at least some, or substantially all, near-infrared wavelengths. In some examples, the wavelength selective absorbing layer may include a coating including one or both of a dye or a pigment. In some examples, the wavelength selective absorbing layer may not include a dye, and may include a near-infrared transmissive visible blocking pigment. For example, the wavelength selective absorbing layer may include Lumogen® Black FK 4280 or Lumogen Black FK 4281 (BASF, Southfield, Mich.).

In some examples, the wavelength selective absorbing layer may include beads or particles to be exhibit diffusing or scattering. For example, the wavelength selective absorbing layer may include a medium and beads or particles dispersed in the medium. The medium may include glass, polymer, or any other suitable optical medium, or combinations thereof. The beads or particles may include silica, glass, polymeric, organic, inorganic, metal oxide, polystyrene, or other suitable scattering materials, or combinations thereof. The wavelength selective absorbing layer may include diffusive or scattering voids or pores, and the voids or pores may include a gas such as air.

The wavelength selective layer may have a near-infrared transmittance, for example, transmittance at wavelengths greater than 830 nm, of greater than 5%, or greater than 10%, or greater than 20%, of greater than 50%, or greater than 70%. In some examples, the wavelength selective layer may transmit less than 5%, or less than 1%, or about 0. In some examples, the wavelength selective layer may have a near-infrared transmittance of greater than 10% for wavelengths greater than 830 nm. In examples, the wavelength selective layer may have a near-infrared transmittance of greater than 20% for wavelengths greater than 850 nm. In some examples, the wavelength selective layer may have a near infrared transmittance of greater than 50% for wavelengths greater than 870 nm. In some examples, the wavelength selective layer may have a near-infrared transmittance of greater than 50% for wavelengths greater than 900 nm. In some examples, the wavelength selective layer may have an average near-infrared transmittance of greater than 75% for wavelengths greater than 900 nm.

Figure 5:
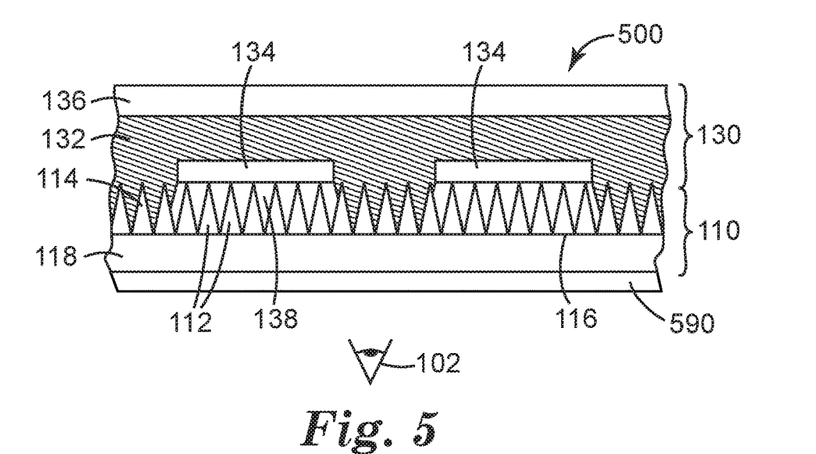
FIG. 5 is a schematic side view of one exemplary embodiment of a retroreflective article of the present disclosure.
Figure 6:
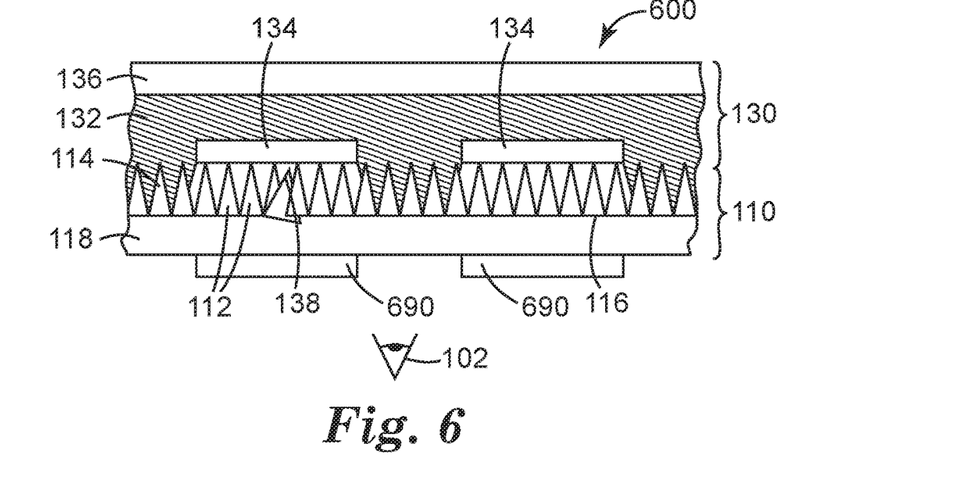
FIG. 6 is a schematic side view of one exemplary embodiment of a retroreflective article of the present disclosure.

In some embodiments, the wavelength selective absorbing layer may cover substantially all the major surface of the retroreflective layer as illustrated in FIG. 5. Retroreflective article 500 includes wavelength selective absorbing layer 590 disposed on overlay layer 118. In other embodiments, the wavelength selective absorbing layer may occupy a partial region or regions of the major surface of the retroreflective layer. For example, it may not be necessary to cover the optically inactive regions of the retroreflective article. Therefore, the wavelength selective absorbing layer may be used only adjacent the optically active regions, reducing costs associated with layer. In other words, as illustrated in FIG. 6, wavelength selective absorbing layer 690 may be a discontinuous layer that is substantially registered with the optically active regions (i.e., regions having low refractive index layer 138) of retroreflective article 600. The wavelength selective absorbing layer can be registered with the optically active regions using fiducials or other markings on the retroreflective layer. The wavelength selective absorbing layer can also be registered with the optically active regions using a process wherein the barrier layers are used as a mask. For example, a UV-curable wavelength selective layer can be coated on the retroreflective layer. The UV light source can be positioned on the opposite side of the retroreflective article such that the barrier layers mask portions of the wavelength selective layer from curing. The uncured portions can then be easily removed.

The retroreflective articles of the invention are particularly useful for applications utilizing LiDAR systems. LiDAR systems often have difficulty distinguishing dark colored or black objects. Conventional retroreflective articles can be applied to the surface of a vehicle to make it more detectable but they may change the appearance of the vehicle. In addition, traditional retroreflective articles can make vehicles too visually overwhelming at night and may oversaturate an IR sensor. The retroreflective articles of the invention prove an appropriate level of signal return to IR machine vision units but have minimal or substantially no visual retroreflection.

The retroreflective articles of the invention can be made of flexible or conformable materials so that they may be applied to curved or uneven surfaces. They maybe an adhesive article such as a sticker or tape that can be applied to substrates such as automobile bumpers, car pillars, windows and in vehicle wraps. The retroreflective articles of the invention can be included in or on automotive components such as pigmented fascia, painted fascia, windows or the like. In the case of windows, the retroreflective articles of the present invention can be applied on an interior or exterior surface of a window, or in the case of laminated glass can be placed between the panes of glass.

The retroreflective articles of the invention can also be used on clothing or other objects for safety purposes.

EXAMPLES

Objects and advantages of this invention are further illustrated by the following examples, but the particular materials and amounts thereof recited in these examples, as well as other conditions and details, should not be construed to unduly limit this invention.

Preparation of Retroreflective Layer

Overlay film was made by casting a solution comprising about 5.8% diisobutyl ketone, 18% xylol, 3.4% mineral spirits, 11% BASF Plasticizer, 7.45% Elvacite, 3.0% Uvinul, 2.1% AC-293, 0.10% CPL-46, 5.1% Paraplex G-62, and 44% Geon 178 onto a PET carrier. The coated solution on PET carrier was dried by passing it through a multizone oven with temperatures set to be around 120, 200, and 275F and then the vinyl was fused in a final zone at temperature of around 380F.

The cube corner structure had three sets of intersecting grooves with a pitch or primary groove spacing of 81.3 microns (0.0032 inch). The intersecting grooves form a cube corner base triangle with included angles of 61, 61, 58 degrees resulting in the height of the cube corner elements being 37.6 microns (0.00148 inch). The primary groove spacing is defined as the groove spacing between the grooves which form the two 61 degree base angles of the base triangle.

The cube corner microstructures were prepared using a resin composition formed by combining 25 wt-% bisphenol A epoxy diacrylate (commercially available under the trade designation "Ebecryl 3720" from Cytek, Woodland Park, N.J.), 12 wt-% dimethylaminoethyl acrylate ("DMAEA"), 38 wt-% TMPTA (trimethylol propane triacrylate) and 25 wt-% 1,6 HDDA (hexanediol diacrylate). The formulation had 0.5 pph of TPO (2,4,6-trimethylbenzoyl diphenylphosphine oxide) photoinitiator.

The resin composition was cast at room temperature at 25 fpm (7.6 m/min) onto a metal tool heated to 74° C. (165° F.). The resin composition filled the cavities of the cube corner microstructures in the tool via a rubber nip roller having a gap set to fill the cavities of the embossed pattern on the tool and minimize the amount of resin on the land area of the tool. A retroreflective layer was made by contacting the vinyl film/PET carrier with the cube corner microstructures of the resin. The cube corner microstructure resin was cured through the PET carrier/vinyl film on the tool with twelve Fusion D UV lamp (available from Fusion Systems, Rockville, Md.) set at 600 W/in. Dichroic filters were used in front of the UV lamps to minimize IR heating of the construction. Upon completion of the curing process and removal of the retroreflective layer from the tool, the cube corner microstructures were irradiated by a Fusion D UV lamp to provide a post-UV irradiation cure. The retroreflective layer was passed through an oven set at 149° C. (3° F.) to relax the stresses in the film.

Samples

Figure 7:
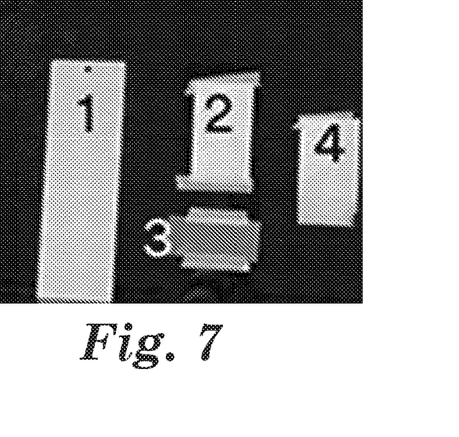
FIG. 7 is a photograph of sample articles prepared for the Example.

FIG. 7 is a photograph showing sample articles prepared as follows. Sample 1 was prepared from a standard white paint board. Sample 2 is a control sample made from the retroreflective layer prepared above with pressure sensitive adhesive contacting all the structured surface to form an optically inactive sample (i.e., there was no low refractive index layer to form optically active area that retroreflects incident light). Sample 3 is a control sample that is 100% retroreflective. The entire surface of the retroreflective layer prepared above was covered with a low refractive index layer of UV cured ink. Sample 4 is an experimental sample of the invention with 4% areal coverage of retroreflector. In this sample, 4% of the retroreflective layer prepared above was covered with a low refractive index layer of UV cured ink. Samples 2, 3, and 4 were prepared using a white adhesive.

Figure 8:
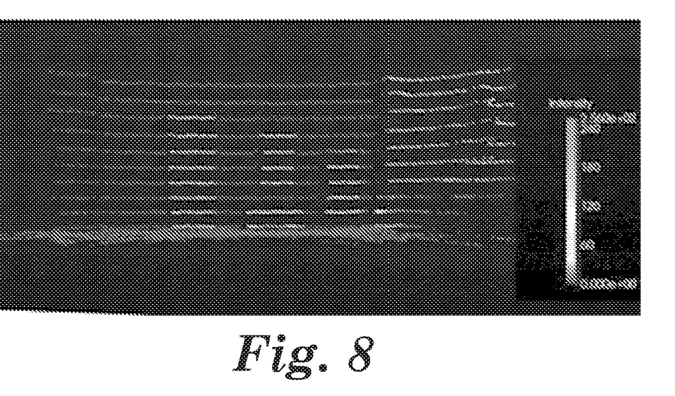
FIG. 8 shows LiDAR output (% intensity) of the sample articles of the Example.

FIG. 8 shows the point field output from a LiDAR unit looking at the scene shown in FIG. 7. The LiDAR output shows that the paint board (Sample 1) and non-retroreflecting sample (Sample 2) had the same visibility. The return signal of the 100% retroreflector (Sample 3) was about twice that as the standard paint sample, but it looked very different in visible light than the other samples. The return signal of the experimental 4% retroreflector (Sample 4) was also about twice that of the standard paint sample (Sample 1), but it looked white in the visible. These results were the same over a broad range of angles.

The complete disclosures of the publications cited herein are incorporated by reference in their entirety as if each were individually incorporated. Various modifications and alterations to this invention will become apparent to those skilled in the art without departing from the scope and spirit of this invention. It should be understood that this invention is not intended to be unduly limited by the illustrative embodiments and examples set forth herein and that such examples and embodiments are presented by way of example only with the scope of the invention intended to be limited only by the claims set forth herein as follows.

We claim:

1. A retroreflective article comprising:
   a. a retroreflective layer including a structured surface that is opposite a major surface;
   b. a wavelength selective absorbing layer adjacent the major surface of the retroreflective layer,
   c. a pressure sensitive adhesive that contacts at least a portion of the structured surface to form an optically inactive area that does not substantially retroreflect incident light; and
   d. at least one low refractive index layer forming an optically active area that retroreflects incident light;
   wherein the optically active area comprises about 25% or less of the structured surface, and
   wherein the wavelength selective absorbing layer comprises one or both of a black dye and a black pigment and visible light retroreflected from the article is not perceptible to the human eye.

2. The retroreflective article of claim 1 wherein the optically active area defines a plurality of first regions and the optically inactive area defines one or more second regions.

3. The retroreflective article of claim 2 wherein the plurality of first regions comprise a barrier layer having sufficient structural integrity to substantially prevent flow of the pressure sensitive adhesive into the low refractive index layer.

4. The retroreflective article of claim 2 wherein the plurality of first regions form a pattern of discrete first regions.

5. The retroreflective article of claim 1 wherein the pressure sensitive adhesive is substantially clear.

6. The retroreflective article of claim 1, wherein the wavelength selective absorbing layer has visible absorption at 400 nm-700 nm greater than about 30% and a near infrared transmittance at 830 nm-900 nm greater than about 30%.

7. The retroreflective article of claim 6 wherein the wavelength selective absorbing layer is adjacent only the first regions.

8. The retroreflective article of claim 1 wherein the structured surface comprises cube corner elements.

9. The retroreflective article of claim 1 wherein the article is flexible or conformable.

10. The retroreflective article of claim 1 wherein the optically active area comprises about 20% or less of the structured surface.

11. The retroreflective article of claim 10 wherein the optically active area comprises about 10% or less of the structured surface.

12. A LiDAR system comprising a LiDAR source, an IR sensor and the retroreflective article of claim 1.

13. An automotive component comprising a pigmented fascia, painted fascia or window, and the retroreflective article of claim 1.

* * * * *